United States Patent
Pan et al.

(10) Patent No.: US 8,934,906 B2
(45) Date of Patent: Jan. 13, 2015

(54) METHOD FOR WIRELESS SERVICE HANDOVER AND BASE STATION AND RELAY STATION USING THE SAME

(71) Applicant: Industrial Technology Research Institute, Hsinchu (TW)

(72) Inventors: Meng-Shiuan Pan, New Taipei (TW); Tzu-Ming Lin, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 88 days.

(21) Appl. No.: 13/723,158

(22) Filed: Dec. 20, 2012

(65) Prior Publication Data

US 2013/0260760 A1    Oct. 3, 2013

Related U.S. Application Data

(60) Provisional application No. 61/618,853, filed on Apr. 2, 2012.

(51) Int. Cl.
| | |
|---|---|
| *H04W 36/32* | (2009.01) |
| *H04W 4/00* | (2009.01) |
| *H04B 7/26* | (2006.01) |
| *H04W 84/04* | (2009.01) |

(52) U.S. Cl.
CPC .............. *H04W 36/32* (2013.01); *H04B 7/2606* (2013.01); *H04W 84/047* (2013.01)
USPC ............................ 455/436; 455/440; 370/331

(58) Field of Classification Search
CPC ............................ H04W 36/32; H04B 7/2606
USPC .................................... 455/436, 440; 370/331
See application file for complete search history.

(56) References Cited

U.S. PATENT DOCUMENTS

| | | | |
|---|---|---|---|
| 5,239,667 A | 8/1993 | Kanai | |
| 5,574,968 A | 11/1996 | Olds et al. | |
| 6,006,097 A | 12/1999 | Hornfeldt et al. | |
| 6,064,885 A | 5/2000 | Rouhollahzadeh et al. | |
| 6,064,888 A | 5/2000 | Lundqvist et al. | |

(Continued)

FOREIGN PATENT DOCUMENTS

TW        200934256        8/2009

OTHER PUBLICATIONS

Zheng et al., "Mobile Speed Estimation for Broadband Wireless Communications over Rician Fading Channels," IEEE Transactions on Wireless Communications 8 (1), Jan. 2009, pp. 1-5.

(Continued)

*Primary Examiner* — Jinsong Hu
*Assistant Examiner* — Jean Chang
(74) *Attorney, Agent, or Firm* — Jianq Chyun IP Office

(57) ABSTRACT

A method, a mobile relay using the same and a DeNB using the same are proposed. The present disclosure reduces the time required to perform wireless service handover by detecting the movement status of the mobile relay relative to a candidate DeNB as to determine whether a mobile relay is approaching or leaving a candidate handover DeNB. By incorporating the movement status into a report sent to the serving DeNB, the serving DeNB would require less time to make handover decisions since the reporting interval could be reduced to one interval, and the time to trigger would not be required. The movement status could be determined based on the propagation time of signals, a list of neighbor cell information, or the Doppler effect.

42 Claims, 14 Drawing Sheets

(56) References Cited

U.S. PATENT DOCUMENTS

| | | |
|---|---|---|
| 6,324,406 B1 | 11/2001 | Zadeh |
| 7,042,858 B1 | 5/2006 | Ma et al. |
| 7,379,739 B2 | 5/2008 | Rajkotia et al. |
| 7,389,111 B2 | 6/2008 | Petrus |
| 7,460,869 B2 | 12/2008 | Pekonen et al. |
| 7,512,403 B2 | 3/2009 | Rajkotia et al. |
| 7,555,299 B2 | 6/2009 | Soliman |
| 7,787,845 B2 | 8/2010 | Lindoff et al. |
| 7,801,081 B2 | 9/2010 | Choi et al. |
| 7,840,227 B2 | 11/2010 | Kahlert et al. |
| 7,852,808 B2 | 12/2010 | Wang |
| 7,904,085 B2 | 3/2011 | Nakata et al. |
| 8,212,407 B2 | 7/2012 | Hu |
| 8,218,504 B2 | 7/2012 | Yamamoto et al. |
| 2003/0214924 A1* | 11/2003 | Kim et al. .................. 370/335 |
| 2004/0058678 A1 | 3/2004 | deTorbal |
| 2004/0121774 A1* | 6/2004 | Rajkotia et al. ............ 455/441 |
| 2005/0272426 A1* | 12/2005 | Yang et al. ................. 455/436 |
| 2006/0239238 A1 | 10/2006 | Fernandez-Corbaton et al. |
| 2008/0225797 A1* | 9/2008 | Kim ............................ 370/331 |
| 2009/0303891 A1* | 12/2009 | Lucas et al. ................ 370/252 |
| 2010/0069070 A1 | 3/2010 | Shi et al. |
| 2010/0124924 A1* | 5/2010 | Cheng et al. ............... 455/434 |
| 2010/0210301 A1 | 8/2010 | Dietz et al. |
| 2010/0260109 A1 | 10/2010 | Ulupinar et al. |
| 2010/0298001 A1 | 11/2010 | Dimou et al. |
| 2010/0323702 A1 | 12/2010 | Yang et al. |
| 2011/0250887 A1 | 10/2011 | Tenny |
| 2011/0251868 A1 | 10/2011 | Mikurak |
| 2011/0267969 A1 | 11/2011 | Ceccherini et al. |
| 2013/0005339 A1* | 1/2013 | Iwamura ..................... 455/436 |
| 2013/0183971 A1* | 7/2013 | Tamaki et al. .............. 455/436 |

OTHER PUBLICATIONS

Tian et al., "Seamless Dual-Link Handover Scheme in Broadband Wireless Communication Systems for High-Speed Rail," IEEE Journal on Selected Areas in Communications 30 (4), May 2012, pp. 708-718.

Karimi et al., "Seamless Wireless Connectivity for Multimedia Services in High Speed Trains," IEEE Journal on Selected Areas in Communications 30 (4), May 2012, pp. 729-739.

Liang et al., "Efficient On-Demand Data Service Delivery to High-Speed Trains in Cellular/Infostation Integrated Networks," IEEE Journal on Selected Areas in Communications 30 (4), May 2012, pp. 780-791.

Zhang et al., "A Novel Self-optimizing Handover Mechanism for Multi-service Provisioning in LTE-Advanced," 2009 International Conference on Research Challenges in Computer Science, Dec. 28-29, 2009, pp. 221-224.

Gao Tingting et al., "A High-speed Railway Mobile Communication System Based on LTE," 2010 International Conference on Electronics and Information Engineering (ICEIE) 1, Aug. 1-3, 2010, pp. V1-414-V1-417.

"Office Action of Taiwan Counterpart Application", issued on Jul. 16, 2014, p. 1-p. 6, in which the listed references were cited.

* cited by examiner

METHOD FOR WIRELESS SERVICE HANDOVER AND BASE STATION AND RELAY STATION USING THE SAME

CROSS REFERENCE TO RELATED APPLICATION

This application claims the priority benefit of U.S.A. provisional application Ser. No. 61/618,853 filed on Apr. 2, 2012. The entirety of the above-mentioned patent application is hereby incorporated by reference herein and made a part of specification.

BACKGROUND

1. Technical Field

The present disclosure generally relates to a wireless service handover scheme, a relay station using the same and a donor eNodeB using the same.

2. Related Art

Recently, as many countries continue to build their high speed rail systems, mobile relay techniques have been considered for the IMT-advanced system in order to support wireless communication services within a high speed rail system in which mobile relays situated on a train carriage could relay network services from nearby base stations to users. The mobile relay which functions as a hub or a repeater may then provide the network coverage of a base station to users in a train through a cable or through a wireless connection.

Such mobile delay technique has been discussed in a LTE-A standard working group in order to support the high speed rail scenario. A typical scenario may include mobile relays equipped in every carriage of a train, and users in a carriage may connect to a nearest mobile relay which subsequently plays the role of an eNB for users. A mobile relay may redirect received data from users to a donor eNB (DeNB) deployed along a train route. On the other hand, a mobile relay may also distribute data from a communication network to users.

As passengers travel through long distances between countries in Europe or among provinces in China, accessibility to a communication network may be desirable for a passenger taking the high speed rail since it would allow the user to remain productive while waiting for the destination to arrive. A users may enjoy activities such as Internet surfing, watching on-line videos, and processing e-mails in the high speed rail, and so forth.

However, for a typical high speed rail system, a mobile relay situated on a fast moving train would speed through an area of coverage provided by a DeNB in a very short period of time. Assuming that a train having the speed as high as 350 kilometers per hour travels through a 2 kilometer coverage area of a serving DeNB, the train would only be in the 2 km area for merely 20.6 seconds. In other words, the mobile relay is only served by its serving DeNB for 20.6 seconds. This means that as the train traverses along the train route, it would suffer from frequent handovers between DeNBs, and also a DeNB would have very little time to make handover decisions.

Therefore, it is important to design a very quick and still yet reliable handover scheme so as to allow users to communication services in a high speed rail.

SUMMARY OF THE DISCLOSURE

Accordingly, The present disclosure is directed to a wireless service handover scheme, a relay device using the same and a donor eNodeB using the same.

The present disclosure directs to a method for a wireless service handover, for use by a moving device, and the method includes the steps of detecting a handover target, measuring a received signal from the handover target, determining based on the received signal whether the moving device is either approaching or leaving each handover target, and transmitting a report comprising the moving device as either approaching or leaving each handover target.

The present disclosure directs to a method for a wireless service handover, for use by a donor eNodeB (DeNB), and the method includes the steps of receiving from a moving device a report comprising a handover target and whether the moving device is approaching or leaving the handover target, determining whether the transmission is periodic, if the transmission is not periodic, handing over the wireless service to the handover target; and if the transmission is periodic, determining whether to hand over the wireless connection for the moving device based on the report.

The present disclosure directs to a relay device having at least a transmitter, a receiver, and a processing circuit coupled to the transmitting and the receiver. The transmitter and the receiver transmits and receives wireless signals. The processing circuit is configured for detecting a handover target, measuring a received signal from the handover target, determining based on the received signal whether the moving device is either approaching or leaving each handover target, and transmitting a report comprising the moving device as either approaching or leaving each handover target.

The present disclosure directs to a donor eNodeB (DeNB) having at least a transmitter, a receiver, and a processing circuit coupled to the transmitting and the receiver. The transmitter and the receiver transmit and receive wireless signals. The processing circuit is configured for receiving from a moving device a report comprising a handover target and whether the moving device is approaching or leaving the handover target, and determining whether the transmission is periodic; if the transmission is not periodic, handing over the wireless service to the handover target, and if the transmission is periodic, determining whether to hand over the wireless connection for the moving device based on the report.

In order to make the aforementioned features and advantages of the present invention comprehensible, preferred embodiments accompanied with figures are described in detail below. It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1A:
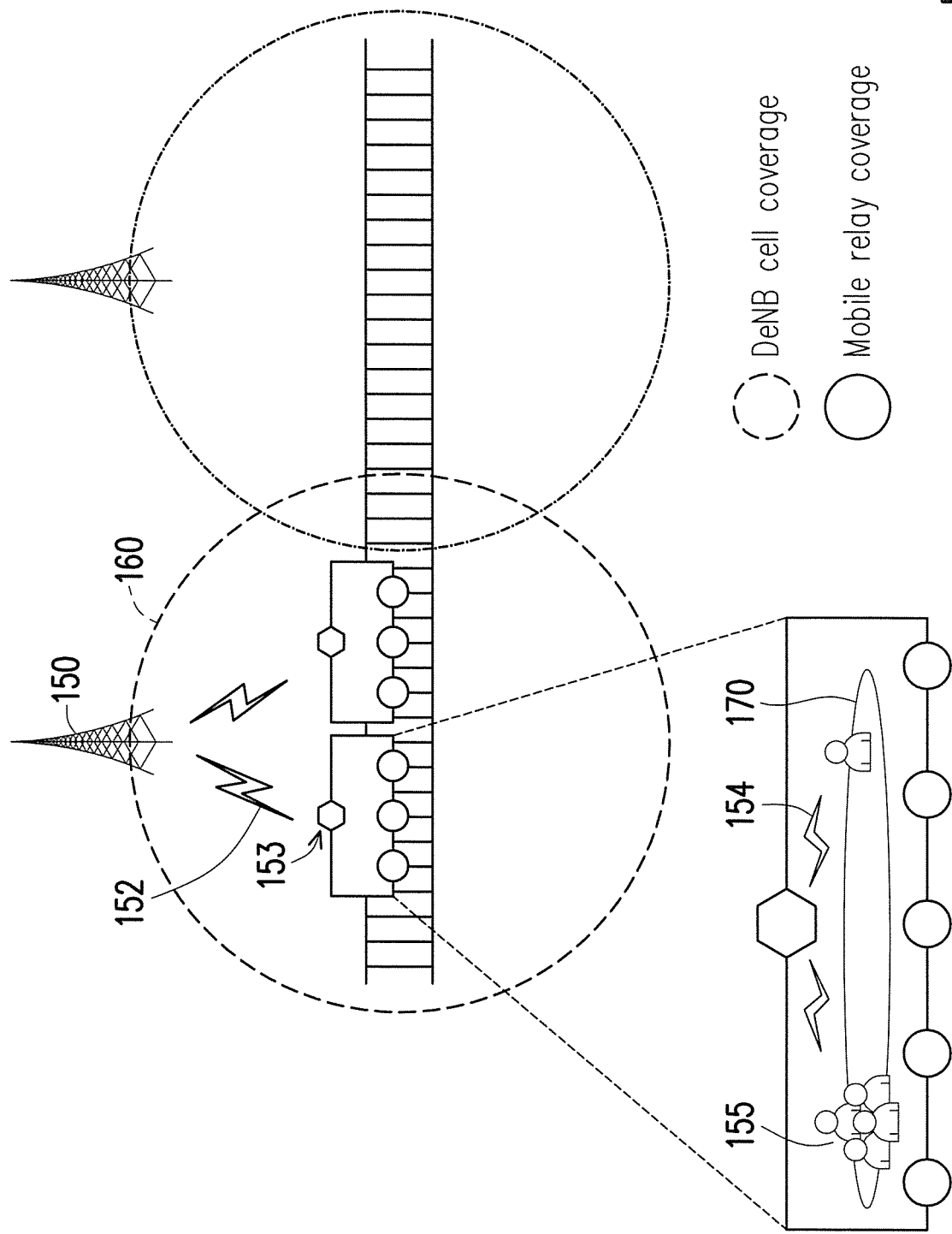
FIG. 1A illustrates an example of a mobile delay scenario in accordance with one of the exemplary embodiments of the present disclosure.

First, FIGS. 1A-1E provides an explanation for the concept upon which the present disclosure is premised upon. FIG. 1A serves as an example to illustrate the concept of providing the network coverage through a mobile delay. FIG. 1A shows a donor eNodeB (DeNB) 150 providing the network coverage within its coverage area 160 to at least one mobile relays 153 located in a train carriage. After a backhaul link 152 is established between the DeNB 150 and the mobile relay 153, the mobile relay may be able to provide the network coverage to at least one user equipments (UEs) 155 through an access link 154 between each UE and the mobile relay 153. The mobile relay 153 then serves as a base station to at least one UEs under its coverage 170.

Figure 1B:
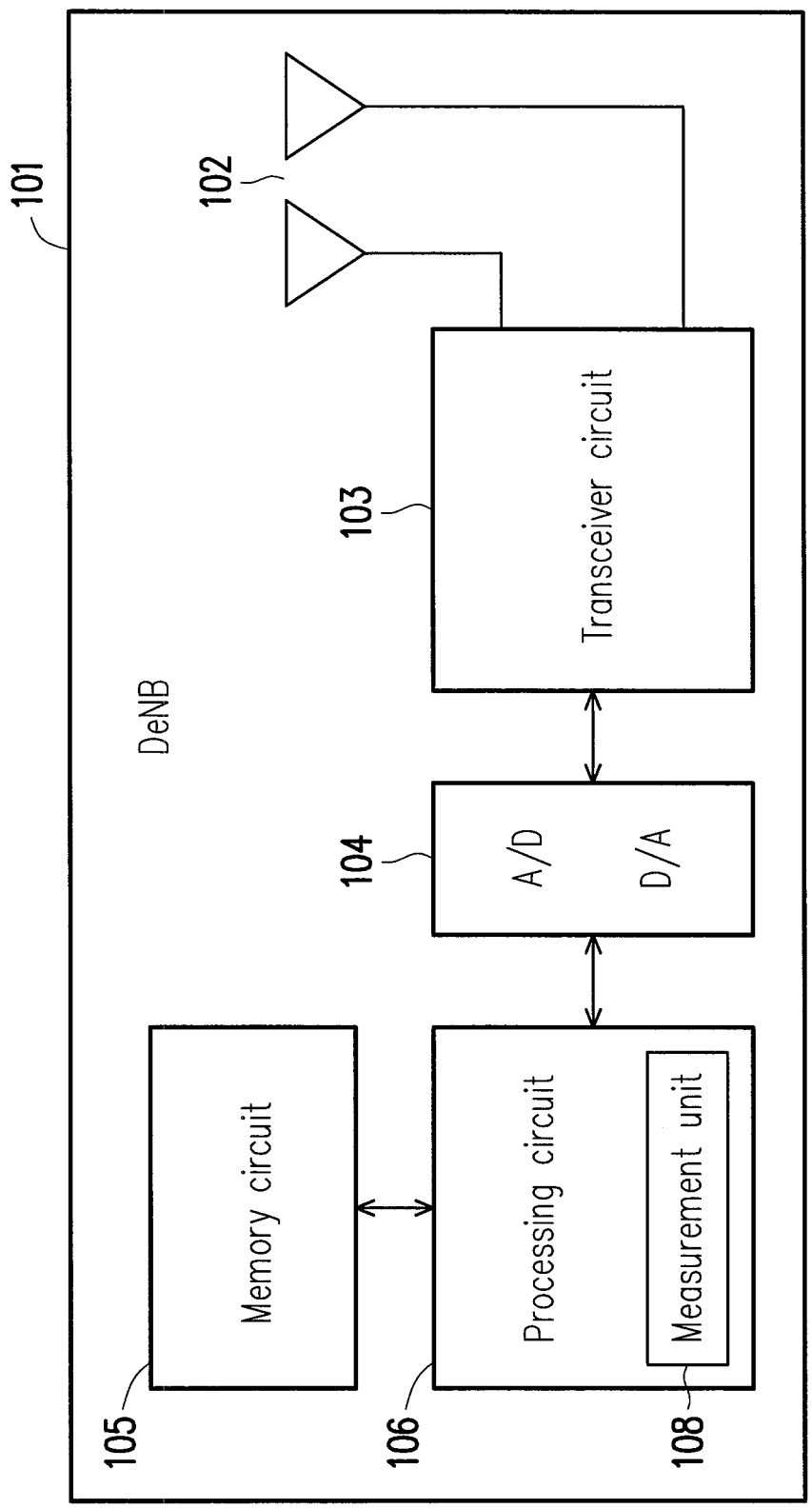
FIG. 1B is an example a functional block diagram of an eNodeB (eNB) in accordance with an exemplary embodiment of the present disclosure.

FIG. 1B shows an example of a functional block diagram of an DeNB used in the relay system of the present disclosure. Each DeNB 101 of the relay system may contain at least but not limited to a transceiver circuit 103, an analog-to-digital (A/D)/digital-to-analog (D/A) converter 104, a processing circuit 106, a memory circuit 105, and at least one antenna unit 102. The transceiver circuit 103 includes at least one power amplifier and may transmits downlink signals and receives uplink signals wirelessly through the at least one antenna unit 102. The transceiver circuit 103 may also perform operations such as low noise amplifying, impedance matching, frequency mixing, up or down frequency conversion, filtering, amplifying, and so like. The analog-to-digital (A/D)/digital-to-analog (D/A) converter (104) is configured to convert from an analog signal format to a digital signal format during uplink signal processing and digital signal format to analog signal format during downlink signal processing.

The processing circuit 106 is configured to process digital signals and includes a measurement unit 108 to perform tasks such as performing handover analysis, processing measurement reports received from a mobile relay, triggering a handover, and so forth. Also, each DeNB 101 may include a memory circuit 105 to store programming codes, codebook configurations, buffered data, or network configurations assigned by the processing circuit 106. The functions of the processing circuit 106 may be implemented using programmable units such as a micro-processor, a micro-controller, a DSP chips, FPGA, and etc. . . . The functions of the processing circuit 106 may also be implement with separate electronic devices or integated circuits and systems (ICS). It should be noted that the measurement unit 108 may be implemented with either hardware or software.

Figure 1C:
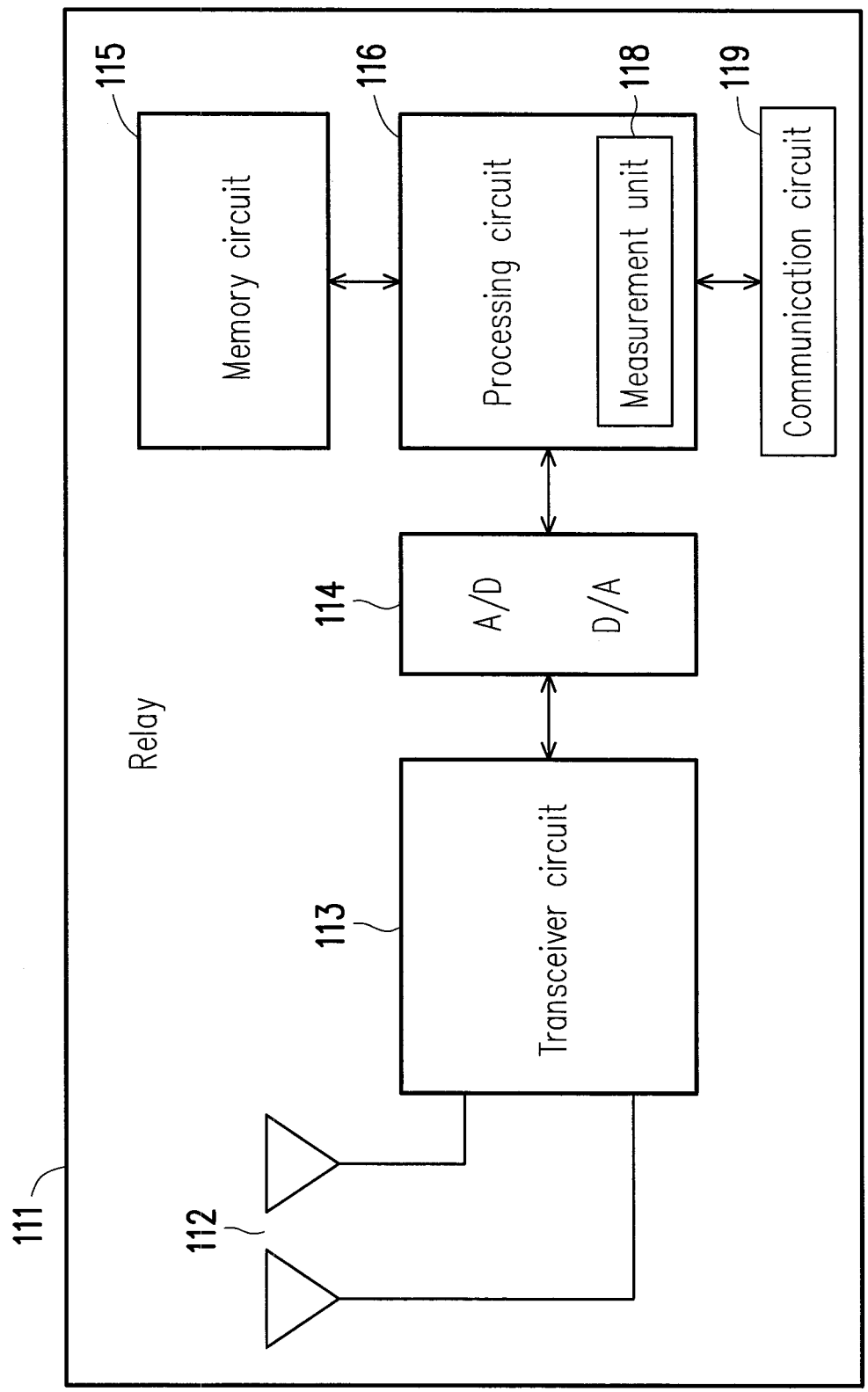
FIG. 1C is an example a functional block diagram of a mobile relay in accordance with an exemplary embodiment of the present disclosure.

FIG. 1C is an example of a functional block diagram of a mobile relay used in the relay system of the present disclosure. Each mobile relay 111 of the communication system may contain at least but not limited to a transceiver circuit 113, an analog-to-digital (A/D)/digital-to-analog (D/A) converter 114, a processing circuit 116, a memory circuit 115, and one or more antenna units 112. The memory circuit 115 may store programming code, buffer data, and network configurations. The processing circuit 116 may further include a measurement unit 118.

Functionally, the mobile relay 111 could be described as relaying signals from a DeNB. The transceiver circuit 113 may include a front end low noise amplifier which maintains a low signal to noise ratio for the system, and then the RF signal may be converted to IF or baseband for further amplification and waveform shaping before converting into digital signals. The mobile relay 111 may further include a communication circuit 119 which provides wired access or fiber optical links to users.

Figure 1D:
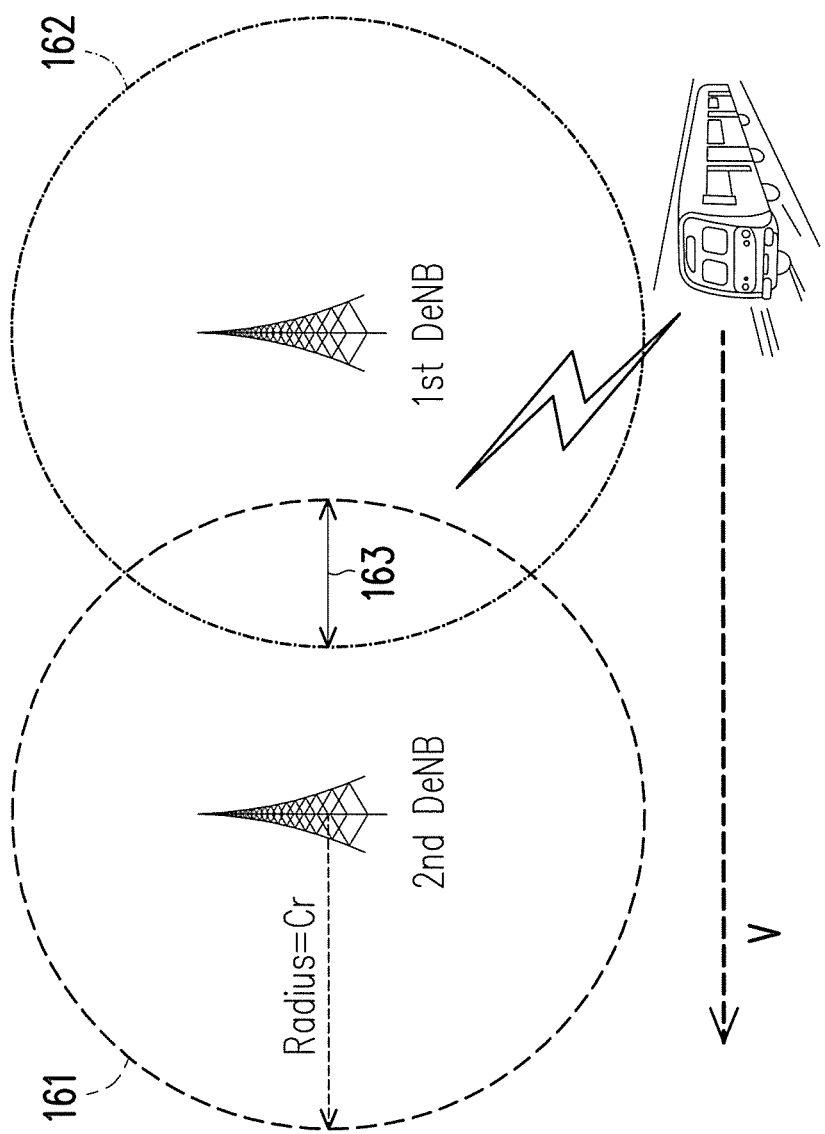
FIG. 1D illustrates the service handover from one DeNB to another as a train travels between two coverage areas.

FIG. 1D illustrates the service handover from one DeNB to another as a train travels between two coverage areas. As the train travels within an coverage area 162 for a first DeNB, the mobile relay could be configured to detect for the presence of nearby DeNBs. As the train moves within the coverage area 161 of a second DeNB, a mobile relay could be configured to start a measurement report and to prepare for the eventual handover procedure. The handover procedure to switch the network service on a mobile relay may be required to be completed before the train leaves the coverage area 162 of the first DeNB in order for the mobile relay to enjoy uninterrupted network service. Therefore, for uninterrupted network service, the measurement report and handover decisions would be performed within the overlapping distance 163 between the first coverage area 162 and the second coverage area 161. The measurement report and handover decision schemes in the LTE-A network, for example, are based on RRC specification 36.331.

The overlapping distance 163 is equal to the train velocity V multiplied by the time required to travel through the overlapping distance 163, and the time required may be characterized as a summation of a handover time period and a measurement time period. (i.e. overlapping distance=V× (handover time+measurement time).

The handover time period ($T_{ho}$) may represent the time for the handover procedure. More specifically, this is the time period starting at the instant of time from which the serving DeNB makes a handover decision to the time instant that the train handovers to the target DeNB. According to IMT-Advance, $T_{ho}$ could be approximately between 27.4 ms to 60 ms. The measurement time period ($T_{meas}$) represents the time for measurement. More specifically, in $T_{meas}$ a mobile relay could collect information related to the locations and signal strengths of nearby DeNBs and the serving DeNB of the mobile relay could make a handover decision based on the information collected by the mobile relay. However, the $T_{meas}$ time period could differ among various methods of reporting performed by a mobile relay. In this following, we describe the methods when the serving DeNB configures a periodical method or an event-based method to a mobile relay.

When using the periodic reporting, a mobile relay would periodically report the measured signal strength of adjacent DeNBs to its serving DeNB. After receiving the reports, the serving DeNB may make observations as for whether the signal qualities of a nearby DeNB may be above a certain threshold before making a handover decision for a number of consecutive reports for the purpose of ensuring that the mobile relay could be successfully handed over to a suitable target DeNB with a higher degree of probability. The $T_{meas}$ time period could therefore be considered as n×report_interval, where n is the number of consecutive report and is an integer greater than one, and report_interval is time between each report from a mobile relay. The smallest reporting interval of a node in LTE-A, for example, is about 120 ms. If assuming that a serving DeNB may need at least 5 reports to make a handover decision, the $T_{meas}$ would then be 600 ms.

When using the event based reporting, a mobile relay would measure adjacent DeNBs to observe if there is a neighbor DeNB with the signal strength higher than a threshold. If there is a neighbor DeNB which satisfies the signal strength requirement, the mobile relay would then start a time to trigger (TTT) timer. If the signal quality of the neighbor is always above the threshold within the TTT, the mobile relay could then be triggered to transmit a report containing that neighbor DeNB to the serving DeNB of the mobile relay. The serving DeNB of the mobile relay could then make a handover decision based on the report.

Figure 1E:
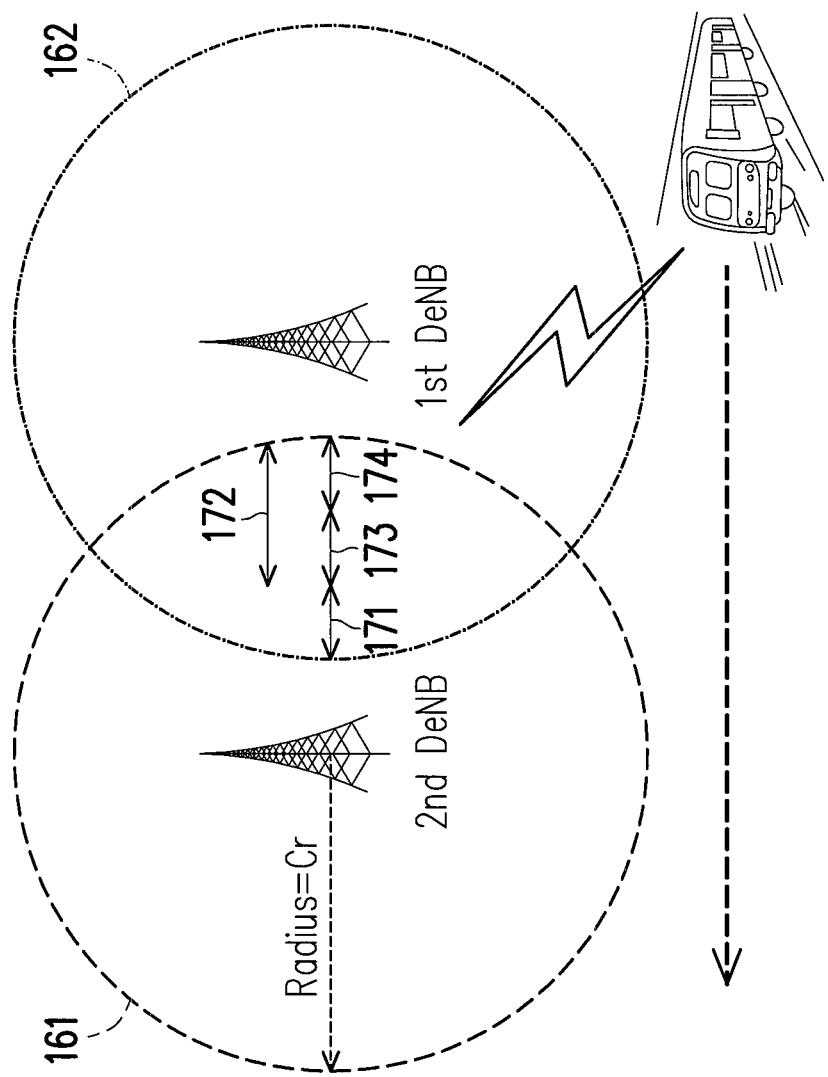
FIG. 1E illustrates making a handover decision when using the event-based reporting.

FIG. 1E illustrates making a handover decision when using the event based reporting. For the event base reporting, the overlapping distance 163 is equal to V×($T_{ho}$171+$T_{meas}$172). The $T_{meas}$ time period 172 can be further characterized as having a TTT time component 173 and a $T_{event}$ time component 174. The smallest TTT 173 could be 40 ms. In common GCF setting, the $T_{meas}$ 172 could be set to 500 ms. In general cases, the $T_{meas}$ 172 time would vary according to the threshold above which the signal strength of a neighbor DeNB would exceed as configured by the network. The $T_{event}$ time 174 could therefore be reduced by pulling down the event threshold.

As $T_{meas}$ 172 time would generally be longer than the $T_{ho}$ 171, and $T_{ho}$ 171 is generally considered a constant, the overall handover procedure could further be increased if the $T_{meas}$ 172 could be decreased. For the periodic reporting method, the $T_{meas}$ 172 could be significantly decreased if n could be set to 1 or be kept to a near minimum. For the event based report method, the $T_{meas}$ 172 could be significantly decreased if the need for the TTT period is significantly diminished or even eliminated.

In the high speed rail scenario, the train could be assumed to travel in a fixed trajectory. Without the aid of network planning information, the serving DeNB of a mobile relay could make handover decisions more easily if the serving DeNB knows that the mobile relay is moving toward or away neighbor cells. More importantly, the required measurement time period by the mobile relay could be shortened if the mobile relay knows that whether the training is moving toward a neighbor cell or away from a neighbor cell. If the train were assumed to move toward a neighboring cell, it may be assumed that the mobile relay would receive better and better signal quality from its DeNB as the train continues to move toward the DeNB. On the flip side, if the train were assumed to move away from a neighboring cell, it could be assumed that the signal quality would be gradually worsened. By using the aforementioned concept, if a mobile relay could determine whether the mobile relay is approaching or leaving a neighbor DeNB (i.e. the mobile relay determines the relative displacement vector with neighboring DeNBs), the movement information could be incorporated into the measurement report to be sent to the serving DeNB and thus the decreasing the measurement time period.

Figure 2:
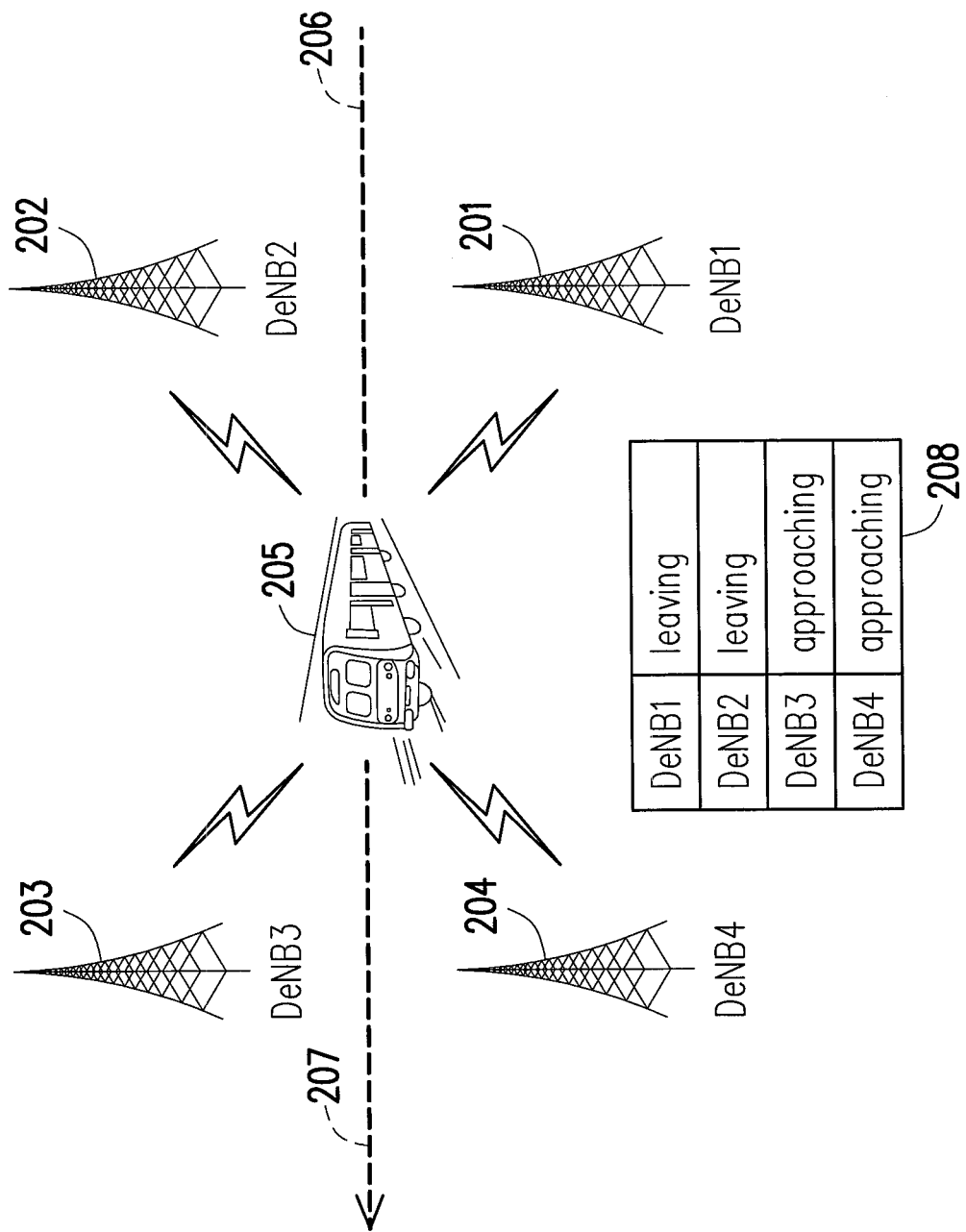
FIG. 2 illustrates reporting the state of neighboring DeNBs.

FIG. 2 is an example illustrating the concept of a report containing movement information relative to a plurality of DeNBs. FIG. 2 shows a high speed vehicle 205, which could be a high speed train, surrounded by DeNB1 201, DeNB2 202, DeNB3 203, DeNB4 204 and traveling at a high velocity along a somewhat fixed trajectory 206. It should be noted that the trajectory having a slight curvature would not affect the operating principle of the present disclosure. As the vehicle 205 traverses from along the trajectory 206 toward the direction marked by the arrow 207, the high speed vehicle 205 would send its serving DeNB a report which contains the movement information 208 of the train relative to each of the DeNBs. Since the vehicle 205 has detected but is moving away from DeNB1 201 and DeNB2, the report would include DeNB1 and DeNB2 as detected donor DeNBs and also would include the corresponding movement status marking both DeNBs 201 and 202 as "leaving". Similarly, the report would include DeNB3 203 and DeNB4 204 with movement status of both marked as "approaching" in the movement information.

To state differently, a mobile relay would first detect all DeNBs nearby and compile a list of candidate DeNBs. The mobile relay would then use various techniques to determine whether the distance between the mobile relay and each DeNB is getting short or longer. If the distance is getting shorter, then the mobile relay would be approaching a candidate DeNB. Otherwise, if the distance is getting longer, then the mobile relay would be leaving a candidate DeNB. The movement status of either leaving or approaching would be incorporated into a report which would assist the serving DeNB to decide which candidate DeNB would be the new serving DeNB for the mobile relay.

Figure 3:
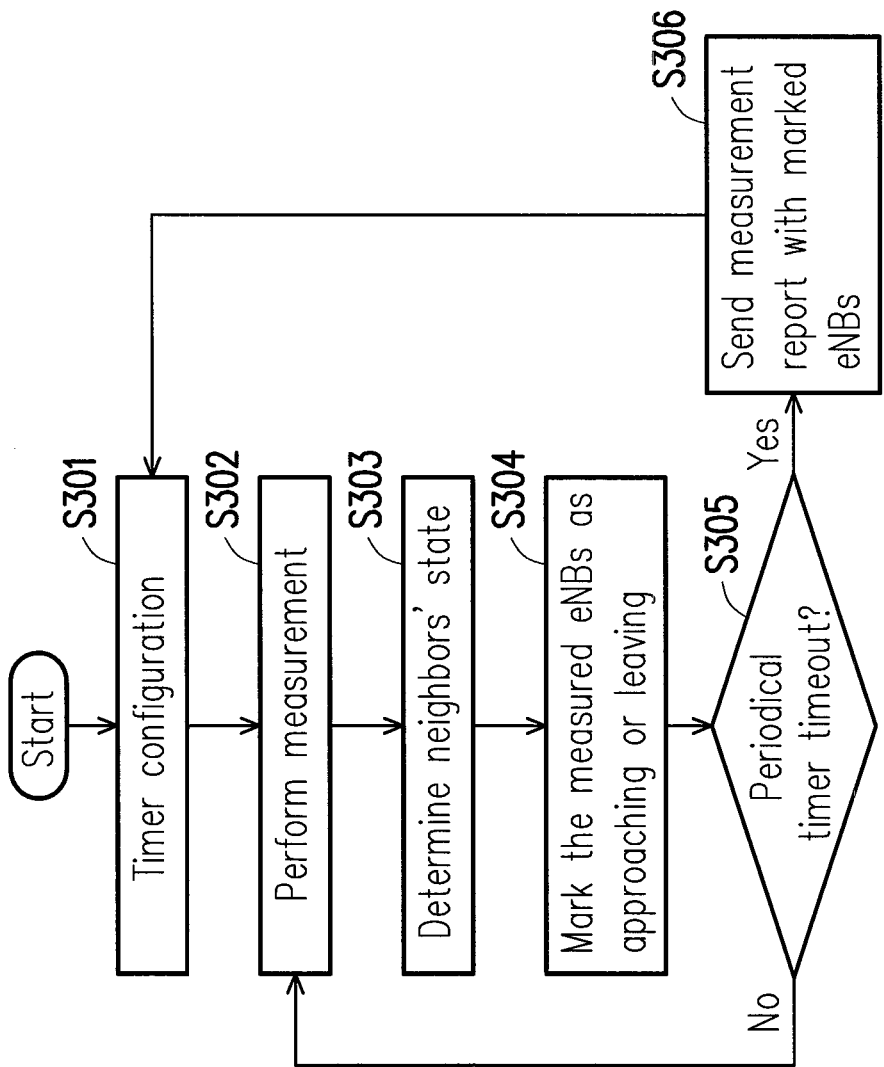
FIG. 3 illustrates the operational procedure of the periodic reporting from the perspective of a mobile relay in accordance with one of the exemplary embodiments of the present disclosure.

Using the abovementioned concept, the operation of a mobile relay would be proposed as follows. The operations of a mobile relay would be different between the configuration of the periodic reporting and the event based reporting. FIG. 3 illustrates the operational procedure when a mobile relay is configured by a serving DeNB to adopt the procedure of the periodic reporting. In step S301, a mobile relay receives a measurement control command with periodical reporting and starts a periodical report timer. Before the timer is expired, in step S302 the mobile relay would measure the signal strength and frequency changes of the adjacent cells of the mobile relay. Based on the received frequency, the mobile relay in step S303 would perform calculations to determine whether the mobile relay is approaching or leaving each of its neighboring DeNBs. In other words, the mobile relay determines states of its neighbor DeNBs' as either "approaching" or "leaving" to indicate whether the mobile relay is approaching or leaving each of the detected neighboring DeNBs. In step S304, the mobile relay mark the measured DeNB as either approaching or leaving. When the timer expires in step S305, the mobile relay sends a measurement report include the signal strength of each of the detected DeNB as well as the state of neighbor DeNBs in its report.

Figure 4A:
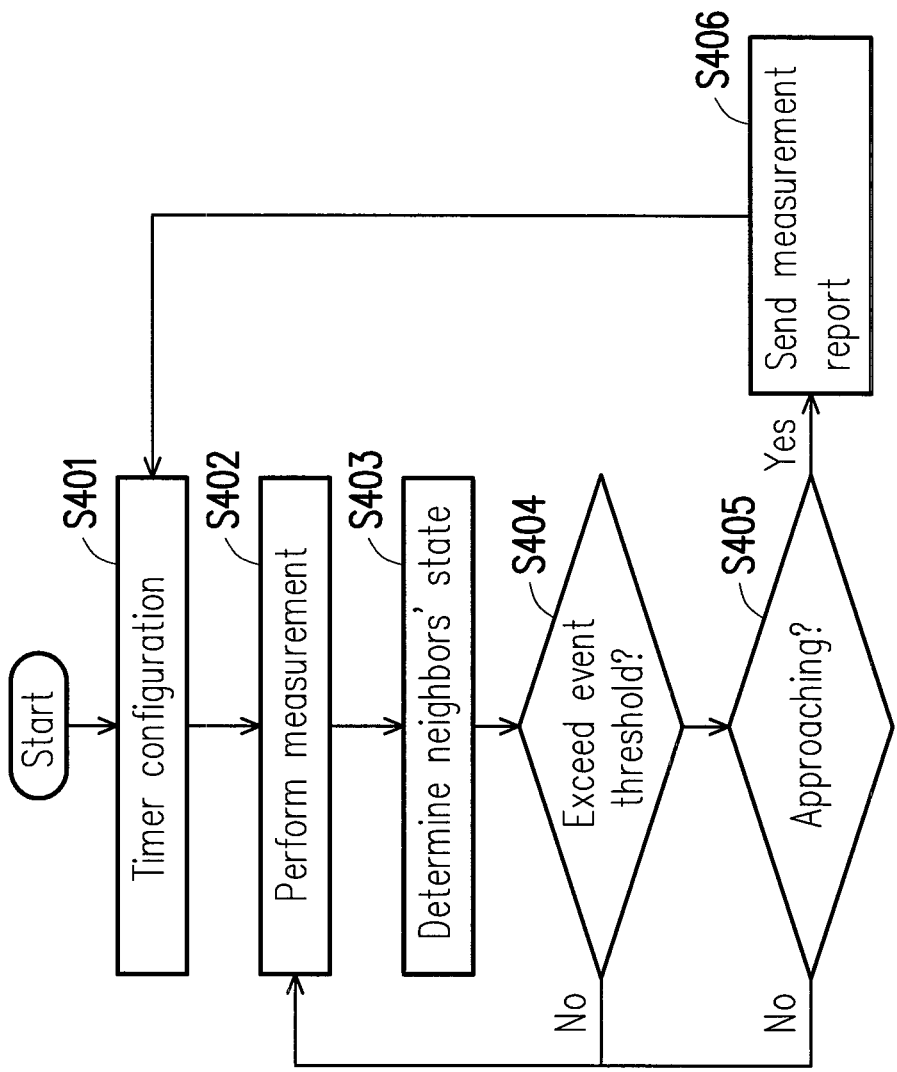
FIG. 4A illustrates the operational procedure of the event based reporting from the perspective of a mobile relay in accordance with one of the exemplary embodiments of the present disclosure.

FIG. 4A illustrates the operational procedure of the event based reporting from the perspective of a mobile relay in accordance with one of the exemplary embodiments of the present disclosure. In step S401, a mobile relay is configured by its serving DeNB to operate with event-based report by receiving a measurement control command from its serving DeNB. In step S402, the mobile relay measures the signal strength and frequency changes of its adjacent cells. In step S403, the mobile relay based on the received frequency marks its neighbor DeNBs' states as either "approaching" or "leaving". If in step S404 the mobile relay finds that the signal strength of a neighbor DeNBs is higher than a threshold, and also in step S405 the mobile relay finds that the neighbors' state is "approaching", then in step S406 the mobile relay would send a report immediately without waiting for TTT. However, if both the conditions of steps S404 and S405 are not satisfied, then the procedure returns back to step S402 in which the mobile relay performs measurement for the signal strengths and frequencies of adjacent cells.

Figure 4B:
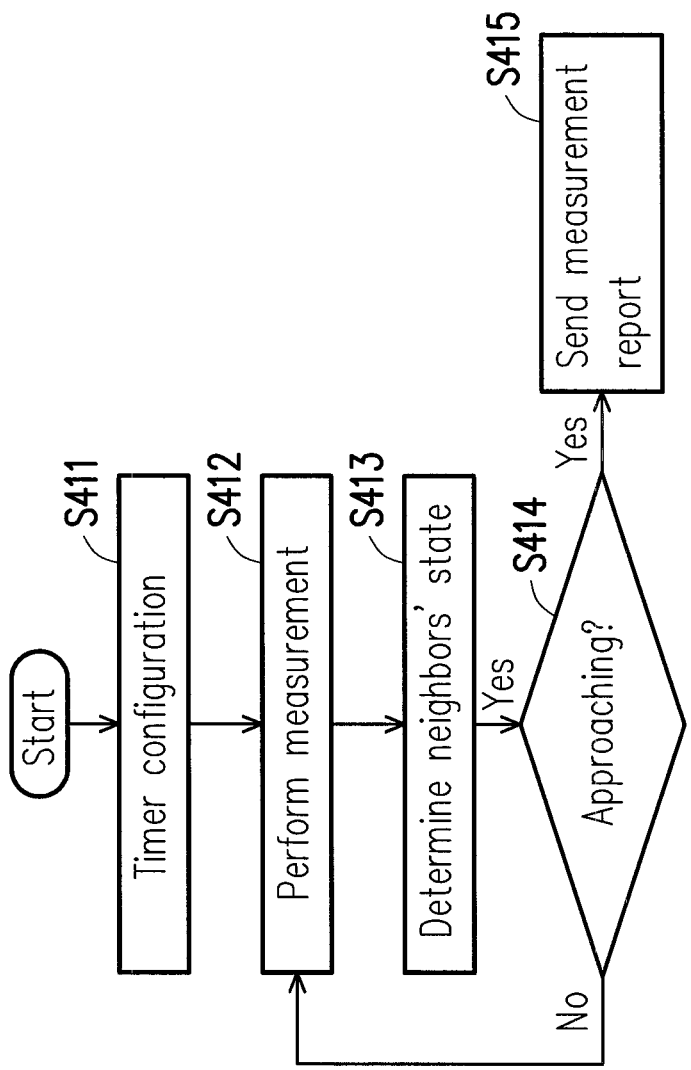
FIG. 4B illustrates the operational procedure of the event based reporting from the perspective of a mobile relay in accordance with another one of the exemplary embodiments of the present disclosure.
Figure 5:
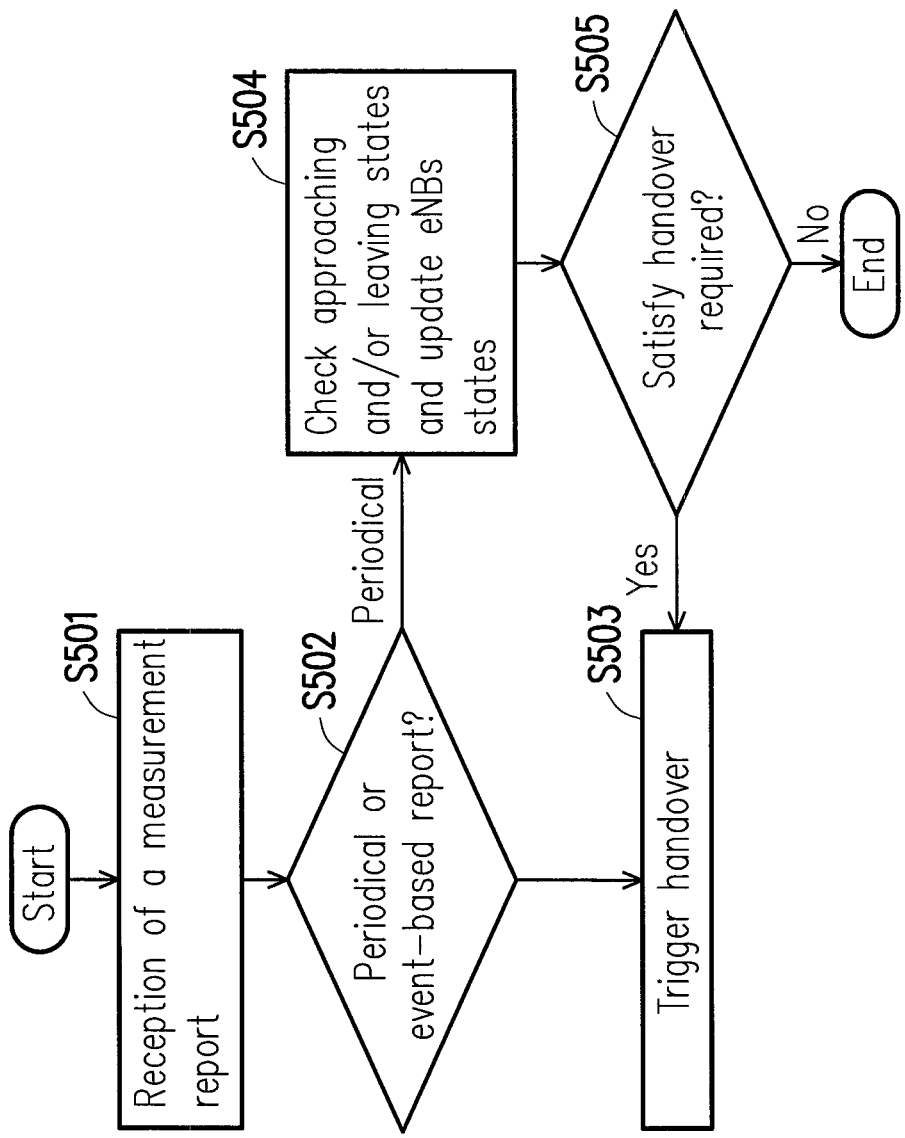
FIG. 5 illustrates the operational procedure of a DeNB in accordance with one of the exemplary embodiments of the present disclosure.

Moreover, in this case, the mobile relay may be allowed to send a measurement report as soon as it finds that the mobile relay is moving toward a cell. In other words, in another embodiment, even the signal strength of a neighbor DeNB fails to exceed a predetermined threshold, the mobile relay would nevertheless send the report regardless. FIG. 4B illustrates the operational procedure of the event based reporting from the perspective of a mobile relay in accordance with another one of the exemplary embodiments of the present disclosure. In step S411, the mobile relay is configured by its serving DeNB to adopt the event based reporting procedure. In step S412, the mobile relay starts performing detection and measurement for the signal strengths and frequencies of the neighboring cells. In step S413, the mobile relay determines the state of the detected neighboring DeNBs as either approaching or leaving. In step S414, if the mobile relays determines that a neighboring DeNB is approaching, then in step S415 the mobile relay would send a measurement report to its serving DeNB. Otherwise, the procedure returns to step S412.

FIG. 4B illustrates the operational procedure of a DeNB in accordance with one of the exemplary embodiments of the present disclosure. The operations of serving DeNB could be different according to whether the mobile relay is configured for periodical or event-based reporting. In step S501, the serving DeNB receives a measurement report from a mobile relay. In step S052, the serving DeNB determines whether the report adopts a periodical reporting or an event based reporting. If the serving DeNB is configured for periodical reporting, the serving DeNB in step S504 would check whether there is a DeNB from whom the signal quality is better than a predetermined threshold as well as whether the mobile relay is approaching or leaving the candidate DeNB. If both conditions of step S504 are satisfied, then in step S505, the DeNB can configure the mobile relay to be handed over to the candidate DeNB. Also the serving DeNB may only require one of the two conditions to be satisfied before deciding to hand over a mobile relay. If the serving DeNB has configured the mobile relay to use event based reporting, then in step S503, the DeNB can directly configure the mobile relay to be handed over to the qualified candidate DeNB as contained in the report.

As for the actual method of determining whether a mobile relay is moving toward or moving away from a cell, a few different schemes are proposed. One of the proposed scheme is a time of arrival (TOA) based scheme for which the propagation times of signals can be used to infer if a mobile relay is moving toward or away from a DeNB. More specifically, the mobile relay may send a pilot signal to a DeNB. When the DeNB receives the pilot signal, the DeNB would reply the pilot signal back to the mobile relay. The mobile relay would then receives the replied signal and record the processing time for the pilot signal to stay in the DeNB. When the mobile relay receives the returned pilot signal, the mobile relay could know the round trip propagation time of this pilot signal. Assuming that the propagation time is T, the distance d between the mobile relay and DeNB could then be characterized as $$d = \left(c \times \frac{T}{2}\right),$$

where c is the velocity of light. After several pilot signals have been sent, if the result of d has been determined to be shorter and shorter for k iterations, then the mobile relay would be considered as moving toward that DeNB. Otherwise, if the result of d has been determined to be longer and longer, then the mobile relay would be considered as moving away from that DeNB.

Another one of the proposed scheme is a neighbor-list based scheme for which neighbor cell information could be utilized to assist the mobile relays to decide whether the mobile relay is leaving or approaching a DeNB. This scheme is based on the observation that high speed railways are usually deployed through less populated areas in which the mobile relay may detect no more than two cells at the same time with one being the serving cell and the other being the target cell. The scheme works as follows.

When the mobile relay receives a neighbor list containing two cells or less with one being the serving cell and the other being a detected candidate cell, the mobile relay would detect whether the signal quality of the candidate cell stays above a predefined threshold for a predetermined period. If so, the mobile relay would consider itself as moving toward the candidate cell.

Under the circumstance that the mobile relay receives a neighbor list containing equal to or more than three cells with one being the serving cell and others being neighbor cells, there could be two judgment schemes. First, if the signal quality of the non-serving candidate cell is above a predefined threshold for a predetermined measurement period, then mobile relay would be considered as moving toward that cell. Secondly, if the exact positions of neighbor DeNBs are known to the mobile relay, TDOA-based positioning scheme could be utilized to infer the position of the mobile relay relative to the DeNB. If the mobile relay has been measured to move toward a DeNB for a predetermined period, then the mobile relay will be considered it is moving toward that DeNB.

The specific method of utilizing the aforementioned TDOA-based positioning scheme is as follows. Assuming that there are three DeNBs, namely, $D_i$, $D_j$, and $D_k$, with positions $(X_i, Y_i)$, $(X_j, Y_j)$, and $(X_k, Y_k)$, respectively, and these DeNBs are time-synchronized, and also assuming that the mobile relay is currently situated $R_i$, $R_j$, and $R_k$ distances away from these DeNBs $D_i$, $D_j$, and $D_k$, then the mobile relay would periodically send a pilot signal with attached timing information to these three DeNBs. When these DeNBs receive the pilot signal, each of the DeNBs would then record the receiving times($t_i$, $t_j$, and $t_k$) and report the receiving times to the mobile relay. After gathering the receive times, the mobile relay can infer the difference of distances between DeNBs as follows:

$$|R_i - R_j| = |c \times (t_i - t_j)| = |\sqrt{(X_i-X)^2+(Y_i-Y)^2} - \sqrt{(X_j-X)^2+(X_j-Y)^2}|$$

$$|R_j - R_k| = |c \times (t_j - t_k)| = |\sqrt{(X_j-X)^2+(Y_j-Y)^2} - \sqrt{(X_k-X)^2+(Y_k-Y)^2}|$$

$$|R_i - R_j| = |c \times (t_i - t_j)| = |\sqrt{(X_i-X)^2+(Y_i-Y)^2} - \sqrt{(X_k-X)^2+(Y_k-Y)^2}|$$

c stands for the velocity of light. Based on the above three equations, the coordinate (x, y) of the mobile relay may be obtained. Based on the coordinate (x, y), whether the mobile relay moves toward for a specific DeNB could be known. The mobile relay could then periodically send pilot signals and infer from returned pilot signals the mobile relay's new position.

Another one of the proposed scheme is to utilize the Doppler effect induced by the signal dissemination between mobile relays and DeNBs to determine whether candidate DeNBs are leaving or approaching a mobile relay. The relationship between the actual observed frequency f of a mobile relay and the emitted frequency $f_0$ could be characterized as follows:

$$f = \frac{fo}{\left(1 - \frac{Vs,r}{c}\right)}$$

where c is the velocity of the emitted wave and the vector $v_{s,r}$ is the relative velocity of observer and emitter. If the direction of the emitter is not parallel with the observer, the $v_{s,r}$ could be characterized as having a $v_{s,r}$-vertical component and a $v_{s,r}$-horizontal component, where $v_{s,r}$-horizontal is parallel to the observer. The $v_{s,r}$-horizontal component could be used to estimate the observed frequency f. When the emitter is moving away from the observer, $v_{s,r}$ would be a positive value. Otherwise, $v_{s,r}$ would be a negative value.

Figure 6:
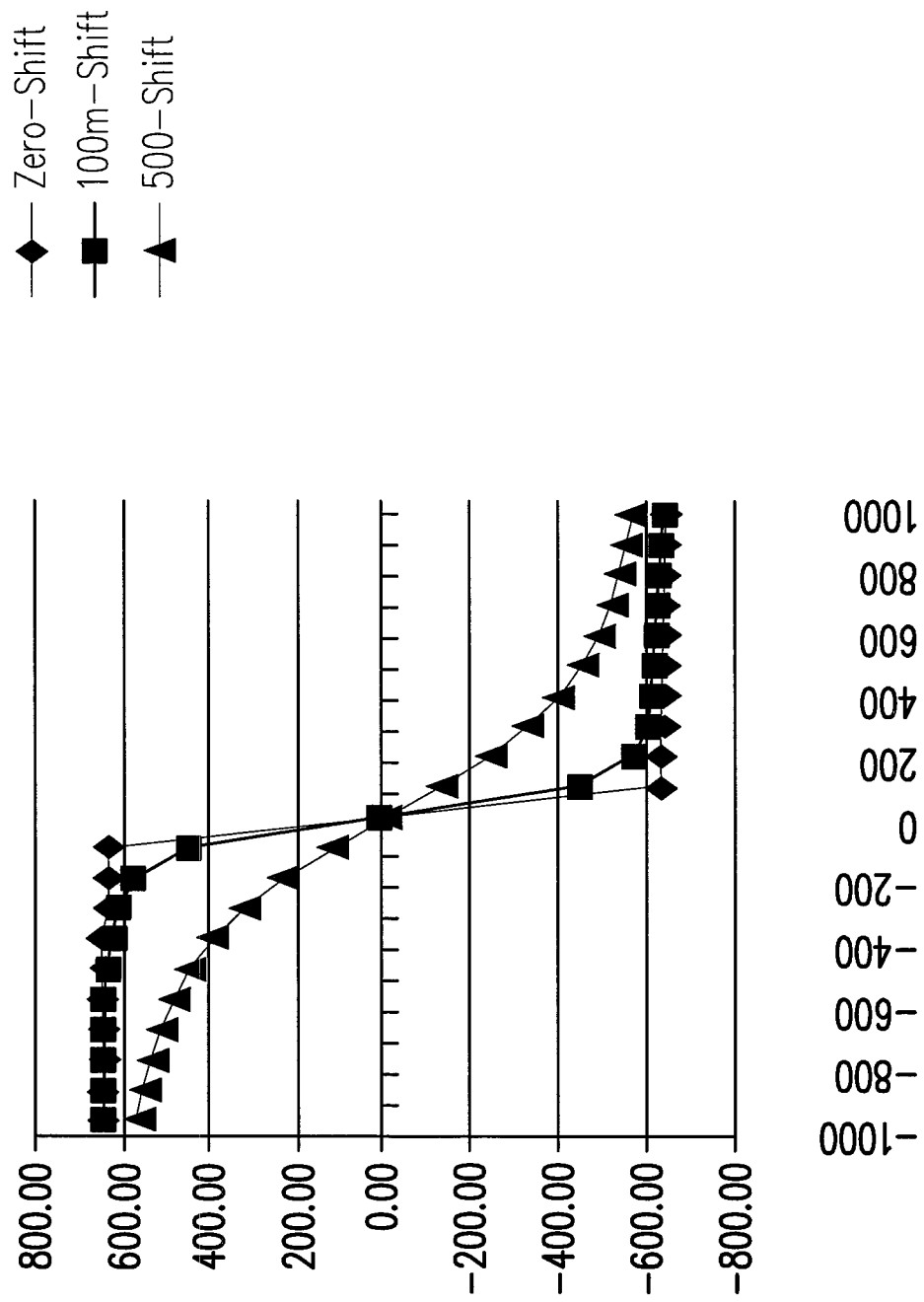
FIG. 6 illustrates the Doppler shift as a function of distances between a mobile relay and DeNBs.

FIG. 6 illustrates the Doppler shift as a function of distances between a mobile relay and DeNBs. The horizontal axis of FIG. 6 is the distance away from a DeNB, and the vertical axis is the relative frequency. The emitted frequency is assumed to be 1.9 GHz, and the velocity of mobile relay is assumed to be 360 km/hr. The mobile relay has a horizontal displacement of zero, 100 m, and 500 m shift from the DeNB. The mobile relay is assumed to set 1000 m far away from the DeNB and then travel approaching to it. When there is a location shift, the observe frequency of the mobile relay would change, and when the mobile relay is right at the base station, the observed frequency will remain the same.

The left hand side of FIG. 7, the DeNB would detect that the frequency of the signal from the mobile relay would be lower and lower. After the zero distance point is crossed, on the right hand side, the right DeNB would realize that the frequency of the mobile relay would be higher and higher. Assuming that a DeNB is the signal source, as a mobile relay is moving away from a DeNB, the receiver of this mobile relay would observe the frequency of the signal from DeNB to be lower. On the other hand, when a mobile relay is moving toward a DeNB, the receiver of this mobile relay would observe that the frequency of signal from the DeNB would become higher. This characteristic is also to be true when the mobile relay is assumed to be the signal source.

According to the LTE-A specifications for example, a DeNB periodically emits signals with fixed frequency. The frequency could be obtained by system information or calculated by mobile relays themselves. According to the present disclosure, each mobile relay would mark its neighbors' states as "approaching" or "leaving" based on the frequencies of periodical signals. If the mobile relay observes that frequency of a periodical signal emitted from a DeNB is lesser than expect for k iterations, it could mark the state of that DeNB as "approaching". If the mobile relay observes that frequency of a periodical signal emitted from a DeNB becomes higher for k iterations, then it could mark the state of that DeNB as "leaving".

Figure 7A:
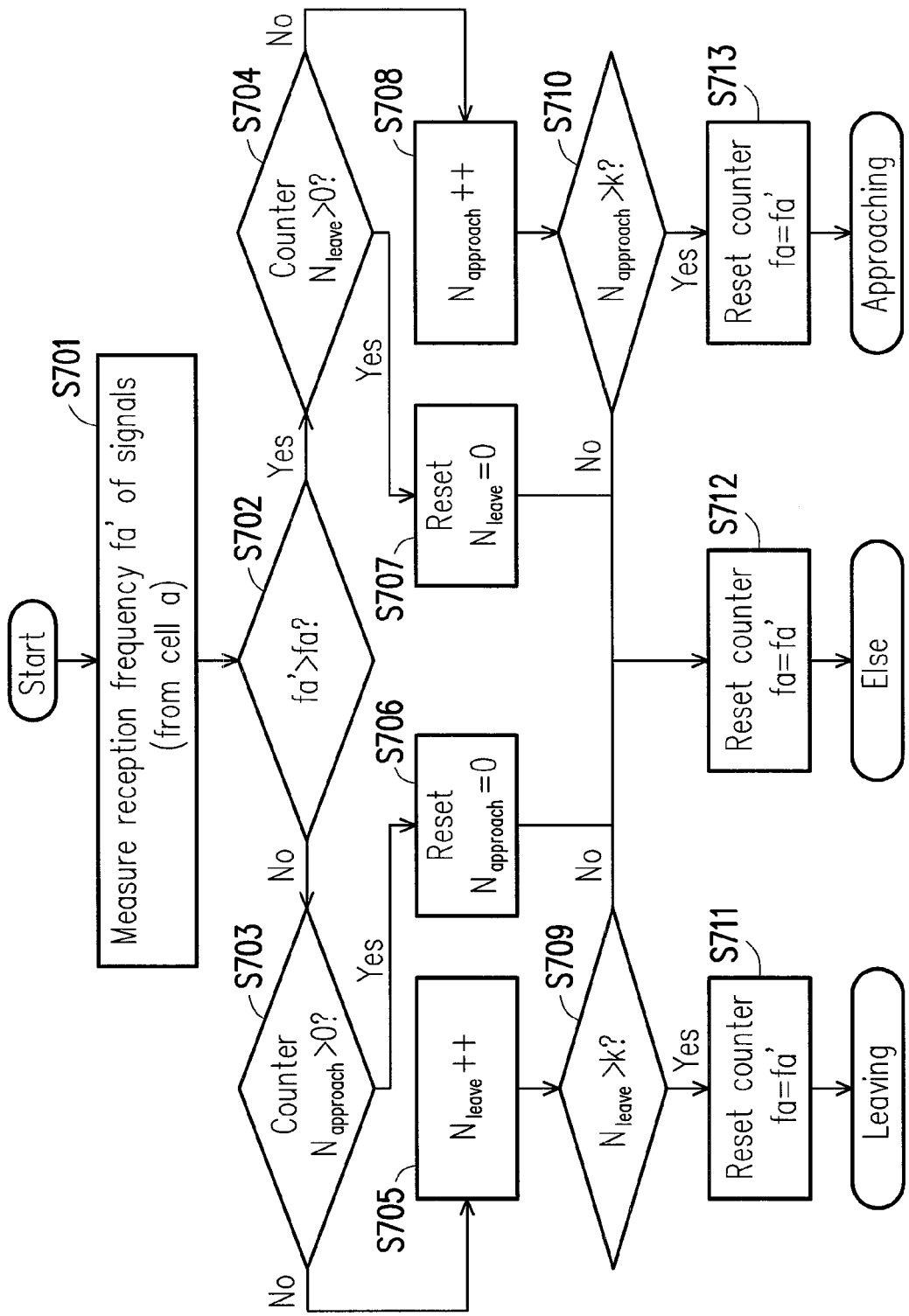
FIG. 7A is a flow chart illustrating using the Doppler effect to determine the state of a DeNB in accordance with one of the exemplary embodiment of the present disclosure.

FIG. 7A is a flow chart illustrating the detailed procedure of using the Doppler effect to determine the state of a DeNB in accordance with one of the exemplary embodiment of the present disclosure. In the procedure, the mobile relay compares the frequency between fa' and fa, where fa' is the measured reception frequency from a cell a, and fa is the actual frequency of the cell a. If the measured frequency by a mobile relay is greater than the actual transmitting frequency fa of cell a, then a counter $N_{approach}$ is incrementally updated. Otherwise, if the measured frequency by a mobile relay is less than the actual transmitting frequency fa of cell a, then a counter $N_{leave}$ gets incrementally updated. When $N_{approach}$ exceeds a predetermined threshold, then the mobile relay is determined to be approaching the cell a, and likewise when $N_{leave}$ exceeds a certain threshold, then the mobile relay is determined to be leaving the cell a.

Referring to FIG. 7A, in step S701, the mobile relay measures the reception frequency fa' from the cell a. In step S702, the mobile relay determines whether the reception of frequency fa' is greater than fa. If yes, then step S704 is executed, but if no, then step S703 is executed. In step S704, the mobile relay determines whether the current counter of $N_{leave}$ is greater than zero. If so, then in step S704 $N_{leave}$ gets reset to zero, and then in step S712 the counter fa is reset to equal to fa'. Otherwise, the process moves to step S710, and $N_{approach}$ gets incrementally updated. If in step S710 $N_{approach}$ is determined to exceed a predetermined threshold k, then in step S713, the mobile relay is determined to be approaching and the fa counter is reset.

Similarly, if the step S703 is executed, the mobile relay first determines whether the counter $N_{approach}$ is greater than zero. If so, then in step 706, the $N_{approach}$ counter gets reset, and also in step S712, the fa counter is reset. Otherwise if $N_{approach}$ is not greater than zero, then $N_{leave}$ gets incrementally updated. If in step S707 the counter $N_{leave}$ exceeds a certain threshold, then the mobile relay is determined to be leaving and cell a in step 711, and the fa counter is reset.

Figure 7B:
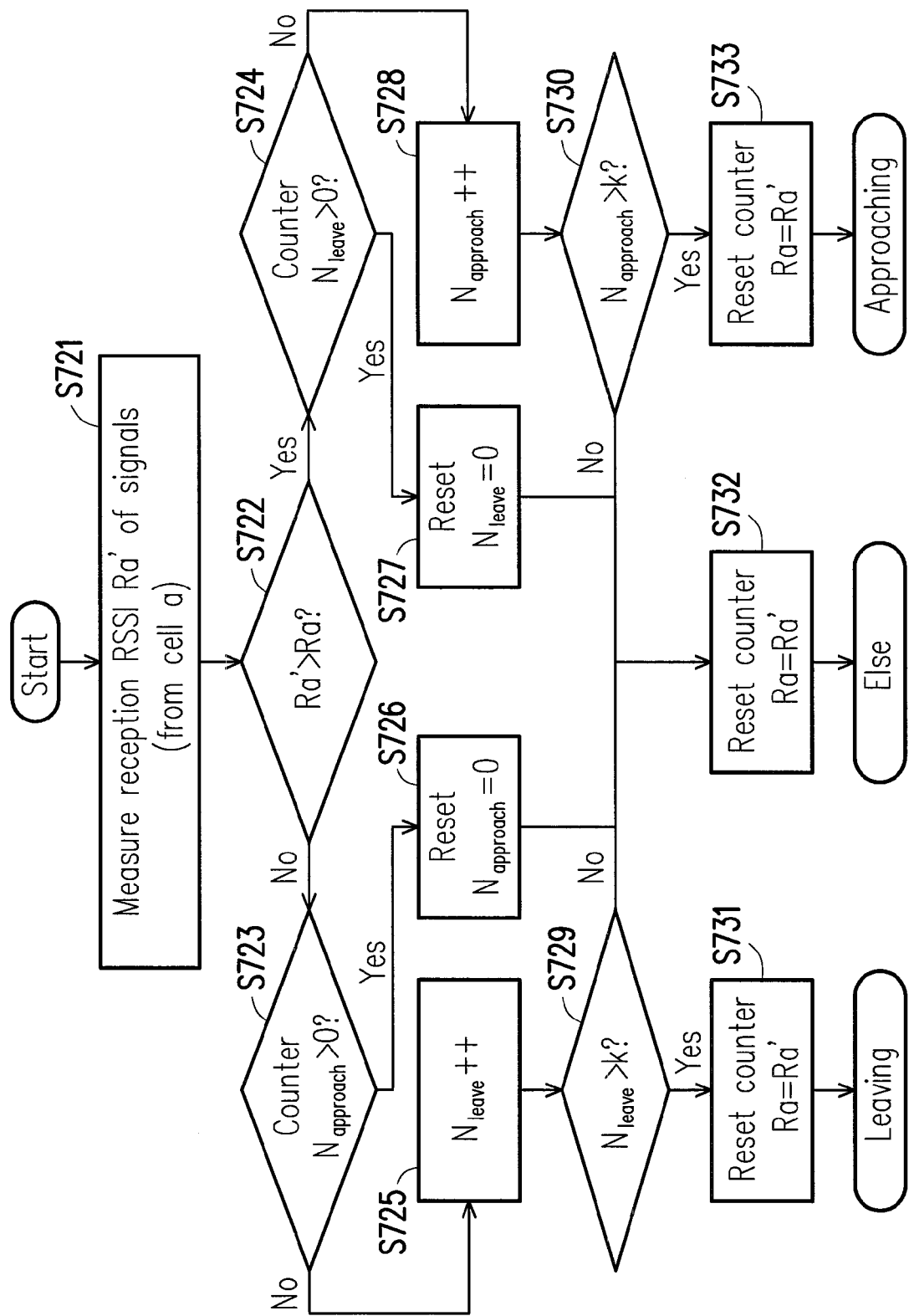
FIG. 7B is a flow chart illustrating using the received RSSI to determine the state of a DeNB in accordance with one of the exemplary embodiment of the present disclosure.

Besides the method of detecting a frequency shift, another proposal to judge if a mobile relay is moving toward or away a neighbor cell could be determined using the received signal strength indicator (RSSI) which is a measurement of the power present in a received radio signal. The detailed methodology is illustrated in FIG. 7B. In step S721, the mobile relay measures the reception of RSSI Ra' of signals from the cell a. In step S722, the mobile relay determines if Ra' is greater than Ra. For steps S723-S733, the procedure is similar to the method of FIG. 7A and therefore the discussion would riot be repeated.

Figure 7C:
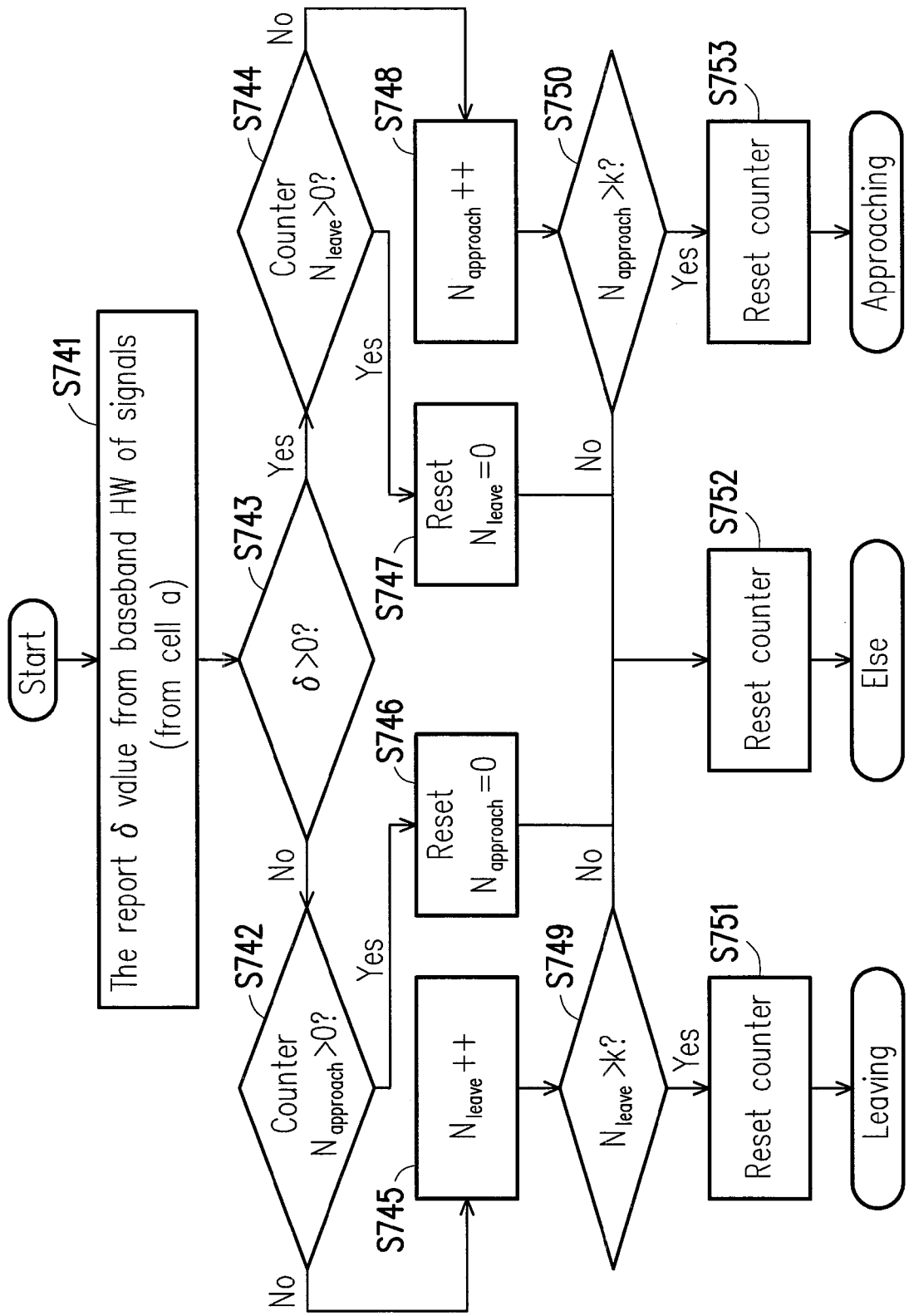
FIG. 7C is a flow chart illustrating using the baseband hardware to indicate an offset value to determine the state of a DeNB in accordance with one of the exemplary embodiment of the present disclosure.

Another methodology is to use the baseband hardware of a receiver which may indicate the Doppler shift by an offset value. When the baseband hardware reports a positive delta δ value, the transmitted frequency experienced by the measuring device has shifted to become lower. In other words, if δ is greater than zero, the mobile relay is moving toward the cell. If δ is less than zero, then the mobile relay is moving away from the cell. FIG. 7C is a flow chart illustrating using the baseband hardware to indicate an offset value to determine the state of a DeNB in accordance with one of the exemplary embodiment of the present disclosure. The procedures of steps S741-S753 is similar to FIG. 7A and FIG. 7B and therefore the discussion would not be repeated.

In view of the aforementioned descriptions, the present disclosure is able to reduce $T_{meas}$ by detecting the movement status of the mobile relay relative to a candidate DeNB as to determine whether a mobile relay is approaching or leaving a candidate handover DeNB. By incorporating the movement status into a report sent to the serving DeNB, the serving DeNB would require less time to make handover decisions. In the case when periodic reporting is used, $T_{meas}$ may require only one report interval. In the case when event based reporting is used, $T_{meas}$ could be reduced to just $T_{event}$ as TTT could be reduced to zero, since $T_{meas}=TTT+T_{event}$. Also $T_{event}$ could further be reduced by decreasing the requirement of received signal threshold in order to trigger a report. Since $T_{meas}$ could be reduced as proposed, the DeNB could be placed further apart as the needed overlapping areas of adjacent cells could be reduced.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for handing over a wireless connection, for use by a moving device, and the method comprising:
   detecting at least one handover target;
   measuring a received signal from each of the at least one handover target;
   determining based on the received signal whether the moving device is either approaching or leaving each of the at least one handover target;
   transmitting a report comprising the moving device as either approaching or leaving each of the at least one handover target;
   determining a state of each of the at least one handover target indicating whether the moving device is approaching or leaving each of the at least one handover target; and
   determining whether to hand over the wireless connection to one of the at least one handover target according to the state of each of the at least one handover target.

2. The method of claim 1 further comprising:
   handing over the wireless connection to the one of the at least one handover target if the moving device is approaching the one of the at least one handover target.

3. The method of claim 1, wherein the moving device is situated on an object which moves along a predetermined path.

4. The method of claim 1, wherein the received signal comprises a signal quality and an observed frequency of the received signal.

5. The method of claim 1, wherein the step of determining based on the received signal whether the moving device is either approaching or leaving each of the at least one handover target comprises:
   determining whether a distance between the moving device and each of the at least one handover target is getting longer or shorter;
   indicating approaching if the distance between the moving device and each of the at least one handover target is getting shorter; and
   indicating leaving if the distance between the moving device and each of the at least one handover target is getting longer.

6. The method of claim 5, further comprising:
   transmitting the report comprising the moving device as either approaching or leaving each of the at least one handover target every first predetermine period.

7. The method of claim 6, further comprising:
   receiving a configuration to transmit the report to a serving base station periodically before the step of measuring the received signal from each of the at least one handover target; and
   starting a timer for measuring the first predetermined period.

8. The method of claim 7 further comprising: when the moving device is determined to be approaching to one of the at least one handover target, transmitting the report comprising the moving device as either approaching or leaving each of the at least one handover target to the handover target that the moving device is determined to be approaching.

9. The method of claim 8 further comprising:
   receiving a configuration to transmit the report when a suitable handover target has been determined before the step of measuring the received signal from each of the at least one handover target.

10. The method of claim 5, wherein the step of determining whether the distance between the moving device and each of the at least one handover target is getting longer or shorter comprises:
    determining whether the distance between the moving device and each of the at least one handover target is getting longer or shorter by using a pilot signal.

11. The method of claim 5, wherein the step of determining whether the distance between the moving device and each of the at least one handover target is getting longer or shorter comprises:
    if the moving device only detects one handover target, considering the distance between the moving device and each of the at least one handover target is getting shorter if the signal quality exceeds a predetermined threshold for a second predetermined period; otherwise considering the distance as getting longer.

12. The method of claim 11 further comprising:
    obtaining the actual position of each of the at least one handover target;
    calculating whether the distance between the moving device and each of the at least one handover target is getting longer or shorter according to the actual position of each of the at least one handover target and a pilot signal.

13. The method of claim 5, wherein the step of determining whether the distance between the moving device and each of the at least one handover target is getting longer or shorter comprises:
    determining whether the distance between the moving device and each of the at least one handover target is getting longer or shorter by using the Doppler effect.

14. A method for handing over a wireless connection, for use by a donor eNodeB (DeNB), and the method comprising:
    receiving from a moving device a report comprising a list of a plurality of handover targets and whether the moving device is approaching or leaving each of the handover targets; and
    determining whether the report is a periodic-based report or an event-based report;
    if the report is the event-based report,
        handing over the wireless connection to one of the handover targets that the moving device is approaching; and
    if the report is the periodic-based report, determining whether to hand over the wireless connection for the moving device based on the report.

15. The method of claim 14, wherein the DeNB provides the wireless connection to the moving device which travels according to a predetermined path.

16. The method of claim 14, wherein the report indicates whether the distance between the moving device and each of the handover targets is getting longer or shorter, and if the distance is getting longer, the handover targets are determined to be leaving the moving device, and if the distance is getting shorter, the handover targets are determined to be approaching the moving device.

17. The method of claim 14, wherein the step of determining whether to hand over the wireless connection for the moving device based on if the report is the periodic-based report or the event-base report comprises:
   handing over the wireless connection to one of the handover targets if the report is not received periodically.

18. The method of claim 14, wherein the report further comprises information for each of the handover targets, wherein the information for each of the handover targets further comprises a signal quality of each of the handover targets.

19. The method of claim 18, wherein the step of determining whether to hand over the wireless connection to one of the handover targets based on the report comprises:
   determining whether the signal quality of the one of the handover targets exceeds a first threshold;
   determining whether the one of the handover targets whose signal quality exceeds the first threshold is approaching the moving device; and
   if both of the above conditions are affirmative, then the DeNB hands over the wireless connection for the moving device to the one of the handover targets.

20. The method of claim 14 further comprising:
   configuring the moving device to send the report to the DeNB either periodically or not periodically.

21. The method of claim 14 further comprising:
   transmitting to the moving device a neighbor DeNB list comprising the positions of nearby handover targets.

22. A moving device comprising a transmitter, a receiver, and a processing circuit coupled to the transmitter and the receiver wherein the transmitter and the receiver respectively transmits and receives wireless signals and the processing circuit is configured for:
   detecting at least one handover target for handing over a wireless connection;
   measuring a received signal from the at least one handover target;
   determining based on the received signal whether the moving device is either approaching or leaving each of the at least one handover target;
   transmitting a report comprising the moving device as either approaching or leaving each of the at least one handover target; and
   determining a state of each of the at least one handover target indicating whether the moving device is approaching or leaving each of the at least one handover target; and
   determining whether to hand over the wireless connection to one of the at least one handover target according to the state of each of the at least one handover target.

23. The moving device of claim 22, wherein the processing circuit is further configured for:
   handing over the wireless connection to the one of the at least one handover target.

24. The moving device of claim 22, wherein the moving device is situated on an object which moves along a predetermined path.

25. The moving device of claim 22, wherein the received signal comprises a signal quality and an observed frequency of the received signal.

26. The moving device of claim 22, wherein the processing circuit is further configured for determining based on the received signal whether the moving device is either approaching or leaving each of the at least one handover target comprising:
   determining whether the distance between the moving device and each of the at least one handover target is getting longer or shorter;
   indicating approaching if the distance between the moving device and each of the at least one handover target is getting shorter; and
   indicating leaving if the distance between the moving device and each of the at least one handover target is getting longer.

27. The moving device of claim 26, wherein the processing circuit is further configured for:
   transmitting the report comprising the moving device as either approaching or leaving each of the at least one handover target every first predetermine period.

28. The moving device of claim 27, wherein the processing circuit is further configured for:
   receiving a configuration to transmit the report to a serving base station periodically before the step of measuring the received signal from each of the at least one handover target; and
   starting a timer for measuring the first predetermined period.

29. The moving device of claim 28, wherein the processing circuit is further configured for: when the moving device is determined to be approaching to one of the at least one handover target, transmitting the report comprising the moving device as either approaching or leaving each of the at least one handover target to the handover target that the moving device is determined to be approaching.

30. The moving device of claim 29, wherein the processing circuit is further configured for:
   receiving a configuration to transmit the report when a suitable handover target has been determined before the step of measuring the received signal from each of the at least one handover target.

31. The moving device of claim 26, wherein the processing circuit is configured for determining whether the distance between the moving device and each of the at least one handover target is getting longer or shorter comprising:
   determining whether the distance between the moving device and each of the at least one handover target is getting longer or shorter by using a pilot signal.

32. The moving device of claim 26, wherein the processing circuit is configured for determining whether the distance between the moving device and each of the at least one handover target is getting longer or shorter comprising:
   if the moving device only detects one handover target, considering the distance between the moving device and each of the at least one handover target is getting shorter if the signal quality exceeds a predetermined threshold for a second predetermined period; otherwise considering the distance as getting longer.

33. The moving device of claim 32, wherein the processing circuit is further configured for:
   obtaining the actual position of each of the at least one handover target;

calculating whether the distance between the moving device and each of the at least one handover target is getting longer or shorter according to the actual position of each of the at least one handover target and a pilot signal.

34. The moving device of claim 26, wherein the processing circuit is configured for determining whether the distance between the moving device and the at least one handover target is getting longer or shorter comprising:
determining whether the distance between the moving device and each of the at least one handover target is getting longer or shorter by using the Doppler effect.

35. A donor eNodeB (DeNB) comprising a transmitter, a receiver, and a processing circuit coupled to the transmitter and the receiver, wherein the transmitter and the receiver respectively transmits and receives wireless signals, and the processing circuit is configured for:
receiving from a moving device a report comprising a list of a plurality of handover targets and whether the moving device is approaching or leaving each of the handover targets; and
determining whether the report is a periodic-based report or an event-based report;
if the report is the event-based report,
handing over the wireless connection to one of the handover targets that the moving device is approaching; and
if the report is the periodic-based report,
determining whether to hand over a wireless connection for the moving device based on the report.

36. The DeNB of claim 35, wherein the DeNB provides the wireless connection to the moving device which travels according to a predetermined path.

37. The DeNB of claim 35, wherein the report indicates whether the distance between the moving device and each of the handover targets is getting longer or shorter, and if the distance is getting longer, the handover targets are determined to be leaving the moving device, and if the distance is getting shorter, the handover targets are determined to be approaching the moving device.

38. The DeNB of claim 35, wherein the processing circuit is further configured for determining whether to hand over the wireless connection for the moving device based on if the report is the periodic-based report or the event-based report comprising:
handing over the wireless connection to one of the handover targets if the report is not received periodically.

39. The DeNB of claim 35, wherein the report comprises information for each of the handover targets, wherein the information for each of the handover targets further comprises a signal quality of each of the handover targets.

40. The DeNB of claim 39, wherein the processing circuit is configured for determining whether to hand over the wireless connection to one of the handover targets based on the report comprising:
determining whether the signal quality of the one of the handover targets exceeds a first threshold;
determining whether the one of the handover targets is approaching the moving device; and
if both of the above conditions are affirmative, then the DeNB hands over the wireless connection for the moving device to the one of the handover targets.

41. The DeNB of claim 35, wherein the processing circuit is further configured for:
configuring the moving device to send the report to the DeNB either periodically or not periodically.

42. The DeNB of claim 35, wherein the processing circuit is further configured for:
transmitting to the moving device a neighbor DeNB list comprising the positions of nearby handover targets.

* * * * *